(12) United States Patent
Cheng et al.

(10) Patent No.: US 12,197,785 B2
(45) Date of Patent: Jan. 14, 2025

(54) CONTROLLER INTEGRATED CIRCUIT AND METHOD FOR CONTROLLING STORAGE DEVICE FOR HOST DEVICE WITH AID OF QUEUE AUXILIARY NOTIFICATION INFORMATION

(71) Applicant: MEDIATEK INC., Hsin-Chu (TW)

(72) Inventors: Chin-Chin Cheng, Hsinchu (TW); Chih-Chieh Chou, Hsinchu (TW); Tzu-Shiun Liu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 184 days.

(21) Appl. No.: 18/094,991

(22) Filed: Jan. 10, 2023

(65) Prior Publication Data

US 2024/0231686 A1 Jul. 11, 2024

(51) Int. Cl.
*G06F 3/06* (2006.01)
(52) U.S. Cl.
CPC .......... *G06F 3/0659* (2013.01); *G06F 3/0604* (2013.01); *G06F 3/0673* (2013.01)
(58) Field of Classification Search
CPC ...... G06F 3/0604; G06F 3/061; G06F 3/0659; G06F 3/0673; G06F 3/0679
See application file for complete search history.

(56) References Cited

FOREIGN PATENT DOCUMENTS

| CN | 110245097 A | 9/2019 |
|---|---|---|
| TW | 201102828 A1 | 1/2011 |
| TW | I771654 B | 7/2022 |
| WO | 2010/044954 A1 | 4/2010 |

*Primary Examiner* — Yong J Choe
(74) *Attorney, Agent, or Firm* — Winston Hsu

(57) ABSTRACT

A controller integrated circuit (IC) and a method for controlling a storage device for a host device to enhance overall performance are provided. The host device may include the controller IC, where the storage device is positioned outside the host device. The controller IC may include a plurality of first queues, a first queue notification register and a first queue auxiliary notification register, where each first queue of the first queues is arranged to queue first queue entries for being used to interact with the storage device. The first queue notification register may store first queue notification information for indicating whether any first queue of the plurality of first queues sends any first interrupt. The first queue auxiliary notification register may store first queue auxiliary notification information for indicating which first queue of the plurality of first queues is the any first queue that has sent the any first interrupt.

27 Claims, 9 Drawing Sheets

CONTROLLER INTEGRATED CIRCUIT AND METHOD FOR CONTROLLING STORAGE DEVICE FOR HOST DEVICE WITH AID OF QUEUE AUXILIARY NOTIFICATION INFORMATION

BACKGROUND

The present invention is related to storage device control, and more particularly, to a controller integrated circuit (IC) and an associated method for controlling a storage device for a host device with aid of queue auxiliary notification information.

According to the related art, a storage device may conform to Universal Flash Storage (UFS) specification, and a control circuit at the host side may be equipped with some hardware resources, such as submission queues (SQs), completion queues (CQs) and interrupt aggregation groups (IAGs), for managing the accessing of the storage device conforming to the UFS specification. Based on the architecture of the related art, when there is an interrupt related to a set of hardware resources among these hardware resources, such as the SQs, the CQs or the IAGs, an upper layer such as a software module running on the host may need to spend time on determining whether all hardware resources among the set of hardware resources are target hardware resources to be accessed, respectively, causing the overall performance to be reduced. For example, there may be more than one interrupt related to the set of hardware resources such as the SQs, and the software module may need to perform checking operations for all of the SQs one by one to determine which SQ(s) among these SQs have sent the interrupt(s), no matter how many SQs have sent the interrupt(s). For another example, there may be more than one interrupt related to the set of hardware resources such as the CQs, and the software module may need to perform checking operations for all of the CQs one by one to determine which CQ(s) among these CQs have sent the interrupt(s), no matter how many CQs have sent the interrupt(s). Thus, there is a need for a novel method and associated architecture to improve the overall performance of an electronic device without introducing a side effect or in a way that is less likely to introduce a side effect.

SUMMARY

It is an objective of the present invention to provide a controller IC and an associated method for controlling a storage device for a host device with aid of queue auxiliary notification information, in order to solve the above-mentioned problems.

At least one embodiment of the present invention provides a controller IC, for being installed in a host device to control a storage device positioned outside the host device with aid of queue auxiliary notification information. For example, the controller IC may comprise a plurality of first queues, a first queue notification register and a first queue auxiliary notification register, where each first queue of the plurality of first queues may be arranged to queue first queue entries for being used to interact with the storage device. In addition, the first queue notification register may be arranged to store first queue notification information for indicating whether any first queue of the plurality of first queues sends any first interrupt, and the first queue auxiliary notification register may be arranged to store first queue auxiliary notification information for indicating which first queue of the plurality of first queues is the any first queue of the plurality of first queues that has sent the any first interrupt.

At least one embodiment of the present invention provides a method for controlling a storage device for a host device with aid of queue auxiliary notification information, where the method is applicable to a controller IC installed in the host device, and the storage device is positioned outside the host device. The method may comprise: utilizing a plurality of first queues within the controller IC to perform first queuing operations, wherein each first queue of the plurality of first queues is arranged to queue first queue entries for being used to interact with the storage device; utilizing a first queue notification register within the controller IC to store first queue notification information for indicating whether any first queue of the plurality of first queues sends any first interrupt; and utilizing a first queue auxiliary notification register within the controller IC to store first queue auxiliary notification information for indicating which first queue of the plurality of first queues is the any first queue of the plurality of first queues that has sent the any first interrupt.

It is an advantage of the present invention that, through proper design, the controller IC and the associated method provided by the present invention can utilize the first queue auxiliary notification register within the controller IC to store and provide the first queue auxiliary notification information, and more particularly, read one or more run-time registers of one or more specific queues among the plurality of first queues according to the first queue auxiliary notification information, rather than reading the respective run-time registers of all queues among the plurality of first queues. As a result, the controller IC and the associated method provided by the present invention can enhance overall performance.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
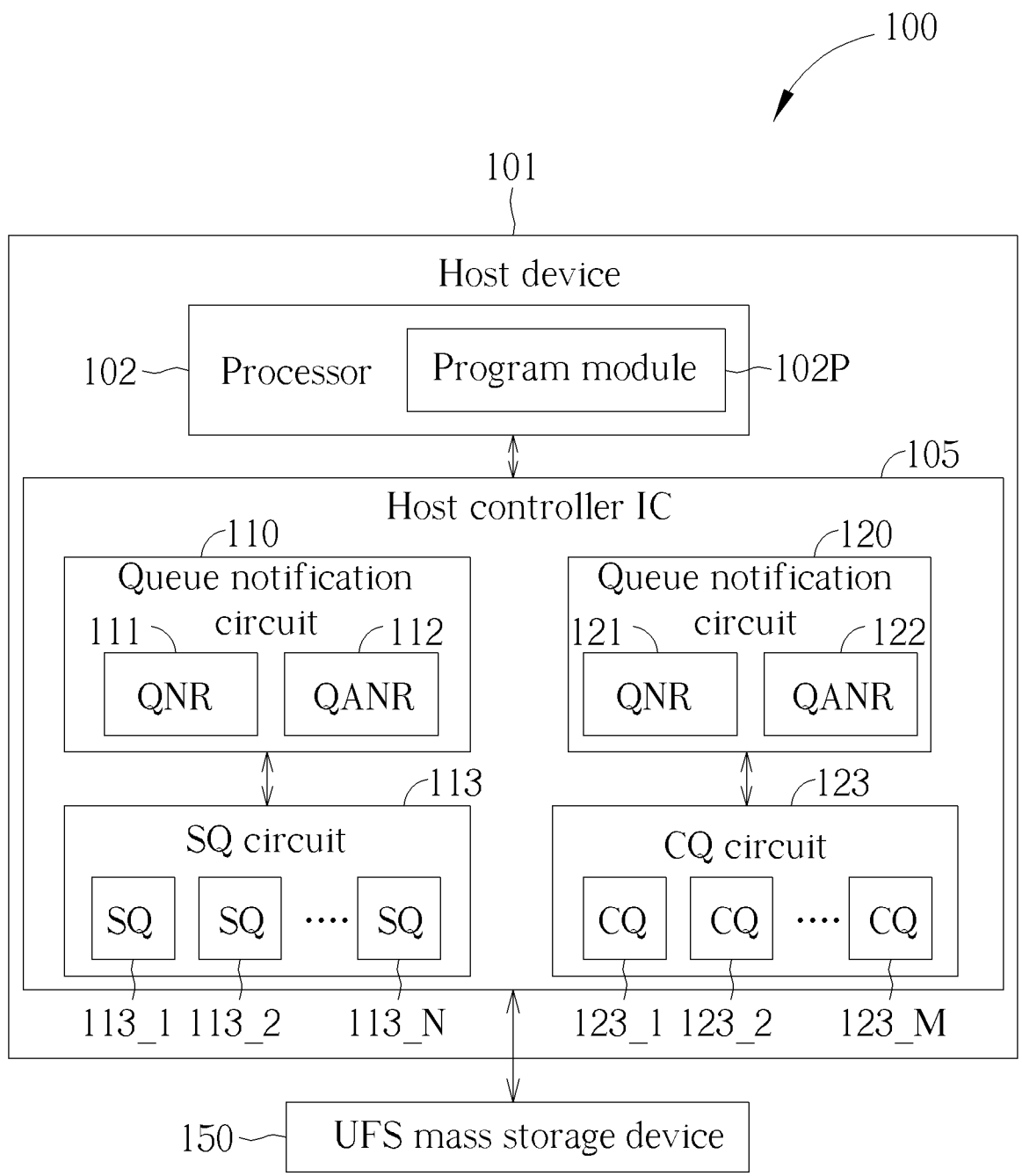
FIG. 1 is a diagram of an electronic device according to an embodiment of the present invention, where the electronic device may comprise a host device and a storage device such as a UFS mass storage device, and the host device may comprise a controller IC such as a host controller IC.

FIG. 1 is a diagram of an electronic device 100 according to an embodiment of the present invention, where the electronic device 100 may comprise a host device 101 and a storage device such as a UFS mass storage device 150, which may be positioned outside the host device 101, where both of the host device 101 and the storage device (e.g., the UFS mass storage device 150) may be positioned within the housing of the electronic device 100, but the present invention is not limited thereto. As shown in FIG. 1, the host device 101 may comprise a processing circuit such as at least one processor (e.g., one or more processors), collectively referred to as the processor 102, and may further comprise a controller IC installed in the host device 101, such as a host controller IC 105. In addition, the controller IC such as the host controller IC 105 may comprise a plurality of queue notification circuits and a plurality of queue circuits. For example, the plurality of queue notification circuits may comprise a first queue notification circuit such as a queue notification circuit 110 and a second queue notification circuit such as a queue notification circuit 120, where the queue notification circuit 110 may comprise a queue notification register 111 and a queue auxiliary notification register 112 (respectively labeled "QNR" and "QANR" for brevity), and the queue notification circuit 120 may comprise a queue notification register 121 and a queue auxiliary notification register 122 (respectively labeled "QNR" and "QANR" for brevity). The plurality of queue circuits may comprise a first queue circuit such as an SQ circuit 113 and a second queue circuit such as a CQ circuit 123, which may be coupled to the queue notification circuits 110 and 120, respectively, where the SQ circuit 113 may comprise a plurality of SQs 113_1, 113_2, . . . and 113_N (e.g., the SQ count N may be a positive integer), and the CQ circuit 123 may comprise a plurality of CQs 123_1, 123_2, . . . and 123_M (e.g., the CQ count M may be a positive integer). For example, N=32 and M=32, but the present invention is not limited thereto. In some examples, the SQ count N and/or the CQ count M may vary.

The aforementioned at least one processor (e.g., the one or more processors) such as the processor 102 may run at least one program module (e.g., one or more program modules), collectively referred to as the program module 102P, for controlling operations of the host device 101. For example, under control of the program module 102P running on the processor 102, the host device 101 may access one or more storage devices such as the UFS mass storage device 150, and more particularly, write data (e.g., system data and user data) into the one or more storage devices such as the UFS mass storage device 150, and read the data (e.g., the system data and the user data) from the one or more storage devices such as the UFS mass storage device 150, but the present invention is not limited thereto. In addition, the controller IC such as the host controller IC 105 may control the one or more storage devices such as the UFS mass storage device 150 for the host device 101 with aid of the queue notification information in the queue notification registers 111 and 121, as well as the queue auxiliary notification information in the queue auxiliary notification registers 112 and 122, to enhance overall performance of the electronic device 100. For example, the controller IC such as the host controller IC 105 may perform the following operations:

(1) utilizing the first queue circuit such as the SQ circuit 113 (e.g., a plurality of first queues such as the plurality of SQs 113_1, 113_2, . . . and 113_N) to perform first queuing operations, where each first queue of the plurality of first queues (e.g., each SQ of the plurality of SQs 113_1, 113_2, . . . and 113_N) may be arranged to queue first queue entries (e.g., SQ entries) for being used to interact with the aforementioned storage device such as the UFS mass storage device 150;

(2) utilizing a first queue notification register such as the queue notification register 111 to store first queue notification information for indicating whether any first queue of the plurality of first queues (e.g., any SQ of the plurality of SQs 113_1, 113_2, . . . and 113_N) sends any first interrupt; and (3) utilizing a first queue auxiliary notification register such as the queue auxiliary notification register 112 to store first queue auxiliary notification information for indicating which first queue of the plurality of first queues (e.g., which SQ of the plurality of SQs 113_1, 113_2, . . . and 113_N) is the aforementioned any first queue of the plurality of first queues (e.g., the aforementioned any SQ of the plurality of SQs 113_1, 113_2, . . . and 113_N) that has sent the aforementioned any first interrupt;

but the present invention is not limited thereto. In another example, the controller IC such as the host controller IC 105 may perform the following operations:

(1) utilizing the second queue circuit such as the CQ circuit 123 (e.g., a plurality of second queues such as the plurality of CQs 123_1, 123_2, . . . and 123_M) to perform second queuing operations, where each second queue of the plurality of second queues (e.g., each CQ of the plurality of CQs 123_1, 123_2, . . . and 123_M) may be arranged to queue second queue entries (e.g., CQ entries) for being used to interact with the aforementioned storage device such as the UFS mass storage device 150;

(2) utilizing a second queue notification register such as the queue notification register 121 to store second queue notification information for indicating whether any second queue of the plurality of second queues (e.g., any CQ of the plurality of CQs 123_1, 123_2, . . . and 123_M) sends any second interrupt; and (3) utilizing a second queue auxiliary notification register such as the queue auxiliary notification register 122 to store second queue auxiliary notification information for indicating which second queue of the plurality of second queues (e.g., which CQ of the plurality of CQs 123_1, 123_2, . . . and 123_M) is the aforementioned any second queue of the plurality of second queues (e.g., the aforementioned any CQ of the plurality of CQs 123_1, 123_2, . . . and 123_M) that has sent the aforementioned any second interrupt.

Based on the architecture shown in FIG. 1, the controller IC such as the host controller IC 105 may be arranged to utilize the plurality of first queues (e.g., the plurality of SQs 113_1, 113_2, . . . and 113_N) to interact with the storage device such as the UFS mass storage device 150 and utilize both of the first queue notification register (e.g., the queue notification register 111) and the first queue auxiliary notification register (e.g., the queue auxiliary notification register 112) to interact with the processing circuit (e.g., the processor 102 such as a central processing unit (CPU)) within the host device 101, to allow the processing circuit (e.g., the processor 102) to control the storage device such as the UFS mass storage device 150 through the controller IC such as the host controller IC 105, and further utilize the plurality of second queues (e.g., the plurality of CQs 123_1, 123_2, . . . and 123_M) to interact with the storage device such as the UFS mass storage device 150 and utilize both of the second queue notification register (e.g., the queue notification register 121) and the second queue auxiliary notification register (e.g., the queue auxiliary notification register 122) to interact with the processing circuit (e.g., the processor 102 such as the CPU) within the host device 101, to allow the processing circuit (e.g., the processor 102) to control the storage device such as the UFS mass storage device 150 through the controller IC such as the host controller IC 105.

According to some embodiments, the aforementioned controller IC (e.g., the host controller IC 105) may be implemented as a UFS host controller. According to some embodiments, a first access direction of the plurality of first queues and a second access direction of the plurality of second queues may be different from each other, but the present invention is not limited thereto.

According to some embodiments, the plurality of first queues such as the plurality of SQs 113_1, 113_2, . . . and 113_N and the plurality of second queues such as the plurality of CQs 123_1, 123_2, . . . and 123_M may be circular queues, and the controller IC such as the host controller IC 105 may be arranged to operate in a multi-circular queue (MCQ) mode.

According to the embodiment shown in FIG. 1, the controller IC such as the host controller IC 105 may comprise the plurality of queue notification circuits such as the first queue notification circuit (e.g., the queue notification circuit 110) and the second queue notification circuit (e.g., the queue notification circuit 120), and may comprise the plurality of queue circuits such as the first queue circuit (e.g., the SQ circuit 113) and the second queue circuit (e.g., the CQ circuit 123), where the plurality of queue notification circuits (e.g., the queue notification circuits 110 and 120) may be arranged to manage the plurality of queue circuits (e.g., the SQ circuit 113 and the CQ circuit 123), respectively, but the present invention is not limited thereto. According to some embodiments, the plurality of queue notification circuits may further comprise at least one other queue notification circuit (e.g., one or more other queue notification circuits), and the plurality of queue circuits may comprise at least one queue group circuit (e.g., one or more queue group circuits), any queue group circuit (e.g., each queue group circuit) of which may comprise at least one queue group (e.g., one or more queue groups) such as at least one combination (e.g., one or more combinations) of at least one first queue (e.g., one or more first queues) and/or at least one second queue (e.g., one or more second queues), where the aforementioned at least one other queue notification circuit (e.g., the one or more other queue notification circuits) may be arranged to manage the aforementioned at least one queue group circuit (e.g., the one or more queue group circuits) such as the aforementioned at least one combination (e.g., the one or more combinations) of the aforementioned at least one first queue (e.g., the one or more first queues) and/or the aforementioned at least one second queue (e.g., the one or more second queues). For example, any queue group among the aforementioned at least one queue group (e.g., the one or more queue groups) may comprise any combination of at least one portion of first queues (e.g., a portion of first queues or all first queues) among the plurality of first queues (e.g., the plurality of SQs 113_1, 113_2, . . . and 113_N) of the first queue circuit (e.g., the SQ circuit 113) and/or at least one portion of second queues (e.g., a portion of second queues or all second queues) among the plurality of second queues (e.g., the plurality of CQs 123_1, 123_2, . . . and 123_M) of the second queue circuit (e.g., the CQ circuit 123), such as the combination of all first queues among the plurality of first queues (e.g., the plurality of SQs 113_1, 113_2, . . . and 113_N) of the first queue circuit (e.g., the SQ circuit 113), the combination of all second queues among the plurality of second queues (e.g., the plurality of CQs 123_1, 123_2, . . . and 123_M) of the second queue circuit (e.g., the CQ circuit 123), and the combination of a portion of first queues among the plurality of first queues (e.g., the plurality of SQs 113_1, 113_2, . . . and 113_N) of the first queue circuit (e.g., the SQ circuit 113) and a portion of second queues among the plurality of second queues (e.g., the plurality of CQs 123_1, 123_2, . . . and 123_M) of the second queue circuit (e.g., the CQ circuit 123). According to some embodiments, the aforementioned at least one queue group (e.g., the one or more queue groups) such as a plurality of queue groups may comprise multiple subsets of the plurality of first queues (e.g., the plurality of SQs 113_1, 113_2, . . . and 113_N), respectively, and more particularly, may comprise multiple subsets of the plurality of second queues (e.g., the plurality of CQs 123_1, 123_2, . . . and 123_M), respectively. For brevity, similar descriptions for these embodiments are not repeated in detail here.

Figure 2:
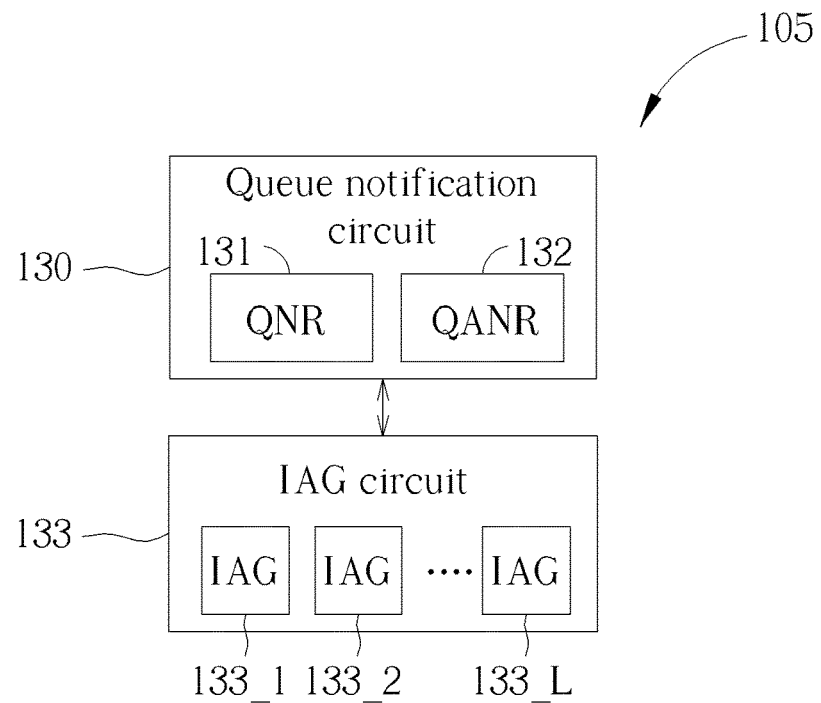
FIG. 2 is a diagram illustrating some implementation details of the controller IC such as the host controller IC shown in FIG. 1 according to an embodiment of the present invention.

FIG. 2 is a diagram illustrating some implementation details of the controller IC such as the host controller IC 105 shown in FIG. 1 according to an embodiment of the present invention. For example, a third queue notification circuit among the aforementioned at least one other queue notification circuit (e.g., the one or more other queue notification circuits) may be implemented as a queue notification circuit 130, where the queue notification circuit 130 may comprise a queue notification register 131 and a queue auxiliary notification register 132 (respectively labeled "QNR" and "QANR" for brevity). In addition, a first queue group circuit among the aforementioned at least one queue group circuit (e.g., the one or more queue group circuits) may be implemented as an IAG circuit 133, which may be coupled to the queue notification circuit 130, where the IAG circuit 133 may comprise a plurality of IAGs 133_1, 133_2, ... and 133_L (e.g., the IAG count L may be a positive integer). For example, L=32, but the present invention is not limited thereto. In some examples, the IAG count L may vary. Additionally, any IAG 133_l among the plurality of IAGs 133_1, 133_2, ... and 133_L (e.g., the symbol "l" may represent an integer within the interval [1, L]) may be implemented as a combination of at least one SQs (e.g., one or more SQs) and at least one CQs (e.g., one or more CQs), such as any combination of at least one portion of SQs (e.g., a portion of SQs or all SQs) among the plurality of SQs 113_1, 113_2, ... and 113_N of the SQ circuit 113 and at least one portion of CQs (e.g., a portion of CQs or all CQs) among the plurality of CQs 123_1, 123_2, ... and 123_M of the CQ circuit 123.

The controller IC such as the host controller IC 105 may control the one or more storage devices such as the UFS mass storage device 150 for the host device 101 with aid of the queue notification information in the queue notification registers 111, 121 and 131, as well as the queue auxiliary notification information in the queue auxiliary notification registers 112, 122 and 132, to enhance overall performance of the electronic device 100. For example, the controller IC such as the host controller IC 105 may perform the following operations:

(1) utilizing the first queue group circuit such as the IAG circuit 133 (e.g., the plurality of queue groups such as the plurality of IAGs 133_1, 133_2, ... and 133_L) to perform third queuing operations;

(2) utilizing a queue group notification register such as the queue notification register 131 to store queue group notification information for indicating whether any queue group of the plurality of queue groups (e.g., any IAG of the plurality of IAGs 133_1, 133_2, ... and 133_L) sends any queue group interrupt; and (3) utilizing a queue group auxiliary notification register such as the queue auxiliary notification register 132 to store queue group auxiliary notification information for indicating which queue group of the plurality of queue groups (e.g., which IAG of the plurality of IAGs 133_1, 133_2, ... and 133_L) is the aforementioned any queue group of the plurality of queue groups (e.g., the aforementioned any IAG of the plurality of IAGs 133_1, 133_2, ... and 133_L) that has sent the aforementioned any queue group interrupt;

but the present invention is not limited thereto. For brevity, similar descriptions for this embodiment are not repeated in detail here.

Figure 3:
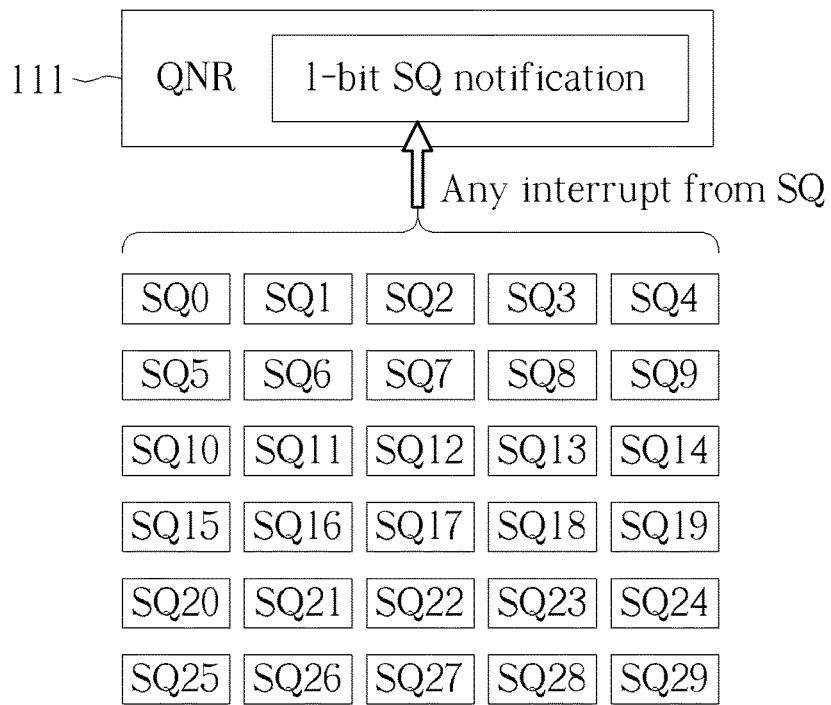
FIG. 3 is a diagram illustrating a one-bit SQ notification control scheme.

FIG. 3 is a diagram illustrating a one-bit SQ notification control scheme. For better comprehension, assume that the queue auxiliary notification register 112 shown in FIG. 1, as well as the function thereof, the associated operations, etc., can be temporarily disabled, but the present invention is not limited thereto. The first queue notification register such as the queue notification register 111 can be implemented by way of a one-bit register, and therefore can be a one-bit queue notification register such as a one-bit SQ notification register, where the first queue notification information in the queue notification register 111 can be regarded as one-bit notification such as one-bit SQ notification (labeled "1-bit SQ notification" for brevity). In addition, there are N SQs such as the plurality of SQs 113_1, 113_2, ... and 113_N in the SQ circuit 113, for example, the SQs SQ0-SQ29 in a situation where N=30 as shown in FIG. 3, but the present invention is not limited thereto. In some examples, the SQ count N may vary.

When there is any interrupt from any SQ 113_n among the plurality of SQs 113_1, 113_2, ... and 113_N (e.g., the symbol "n" may represent an integer within the interval [1, N]), the controller IC such as the host controller IC 105 (e.g., a logic circuit in the queue notification circuit 110) may set the one-bit SQ notification to be equal to a first predetermined logic value such as the logic value "1" (e.g., set the one-bit SQ notification as the logic value "1" and/or change the one-bit SQ notification from a previous or default logic value such as the logic value "0"). For example, there may be more than one interrupt from more than one SQ among the plurality of SQs 113_1, 113_2, ... and 113_N, and the program module 102P running on the processor 102 may need to perform checking operations for all SQs among the plurality of SQs 113_1, 113_2, ... and 113_N one by one to determine which SQ(s) among these SQs have sent the interrupt(s), no matter how many SQs have sent the interrupt(s). According to some embodiments, the controller IC such as the host controller IC 105 can operate without disabling the queue auxiliary notification register 112, and more particularly, can collect the associated queue auxiliary notification information into the queue auxiliary notification register 112 to indicate which source(s) (e.g., which SQ(s)) have sent the interrupt(s), to make the program module 102P be capable of performing the subsequent operations as soon as possible, and thereby improve the overall performance.

Figure 4:
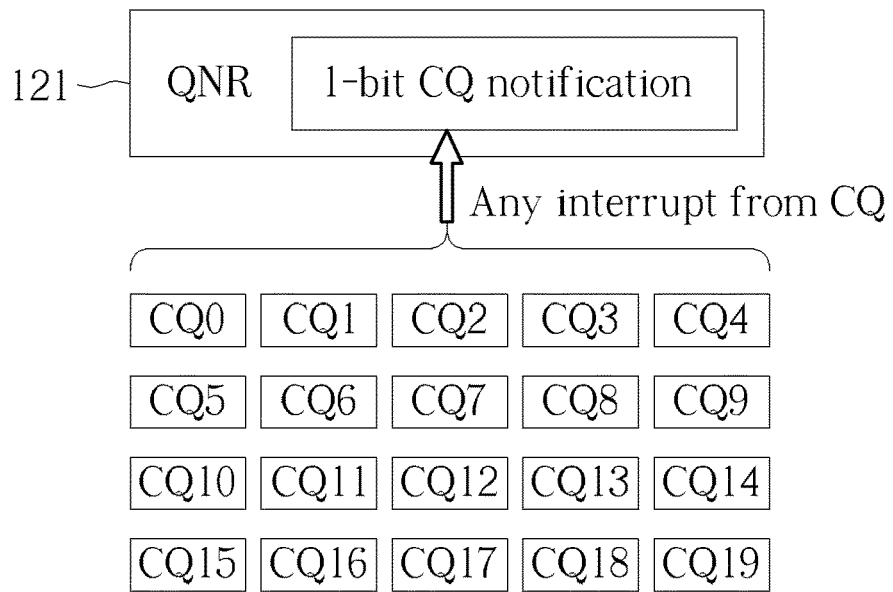
FIG. 4 is a diagram illustrating a one-bit CQ notification control scheme.

FIG. 4 is a diagram illustrating a one-bit CQ notification control scheme. For better comprehension, assume that the queue auxiliary notification register 122 shown in FIG. 1, as well as the function thereof, the associated operations, etc., can be temporarily disabled, but the present invention is not limited thereto. The second queue notification register such as the queue notification register 121 can be implemented by way of a one-bit register, and therefore can be a one-bit queue notification register such as a one-bit CQ notification register, where the second queue notification information in the queue notification register 121 can be regarded as one-bit notification such as one-bit CQ notification (labeled "1-bit CQ notification" for brevity). In addition, there are M CQs such as the plurality of CQs 123_1, 123_2, ... and 123_M in the CQ circuit 123, for example, the CQs CQ0-CQ19 in a situation where M=20 as shown in FIG. 4, but the present invention is not limited thereto. In some examples, the CQ count M may vary.

When there is any interrupt from any CQ 123_m among the plurality of CQs 123_1, 123_2, ... and 123_M (e.g., the symbol "m" may represent an integer within the interval [1, M]), the controller IC such as the host controller IC 105 (e.g., a logic circuit in the queue notification circuit 120) may set the one-bit CQ notification to be equal to the first predetermined logic value such as the logic value "1" (e.g., set the one-bit CQ notification as the logic value "1" and/or change the one-bit CQ notification from a previous or default logic value such as the logic value "0"). For example, there may be more than one interrupt from more than one CQ among the plurality of CQs 123_1, 123_2, ... and 123_M, and the program module 102P running on the processor 102 may need to perform checking operations for all CQs among the plurality of CQs 123_1, 123_2, ... and 123_M one by one to determine which CQ(s) among these CQs have sent the interrupt(s), no matter how many CQs have sent the interrupt(s). According to some embodiments, the controller IC such as the host controller IC 105 can operate without disabling the queue auxiliary notification register 122, and more particularly, can collect the associated queue auxiliary notification information into the queue auxiliary notification register 122 to indicate which source(s) (e.g., which CQ(s)) have sent the interrupt(s), to make the program module 102P be capable of performing the subsequent operations as soon as possible, and thereby improve the overall performance.

Figure 5:
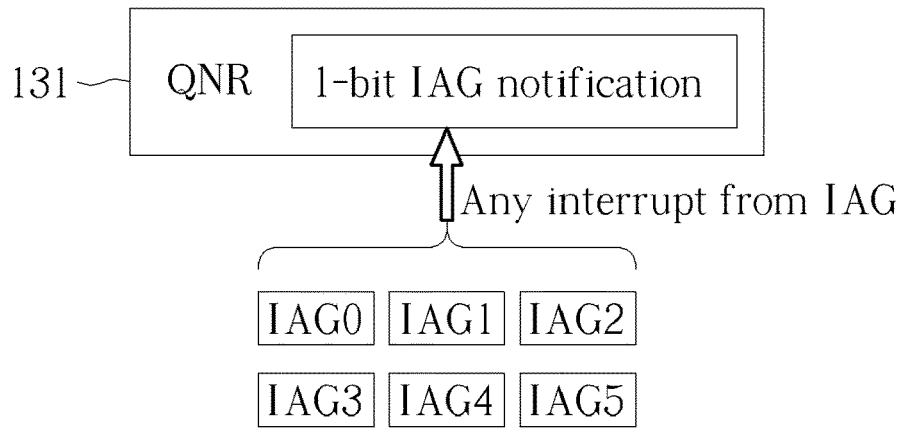
FIG. 5 is a diagram illustrating a one-bit IAG notification control scheme.

FIG. 5 is a diagram illustrating a one-bit IAG notification control scheme. For better comprehension, assume that the queue auxiliary notification register 132 shown in FIG. 2, as well as the function thereof, the associated operations, etc., can be temporarily disabled, but the present invention is not limited thereto. The queue group notification register such as the queue notification register 131 can be implemented by way of a one-bit register, and therefore can be a one-bit queue notification register such as a one-bit IAG notification register, where the queue group notification information in the queue notification register 131 can be regarded as one-bit notification such as one-bit IAG notification (labeled "1-bit IAG notification" for brevity). In addition, there are L IAGs such as the plurality of IAGs 133_1, 133_2, . . . and 133_L in the IAG circuit 133, for example, the IAGs IAG0-IAG5 in a situation where L=6 as shown in FIG. 5, but the present invention is not limited thereto. In some examples, the IAG count L may vary.

When there is any interrupt from any IAG 133_1 among the plurality of IAGs 133_1, 133_2, . . . and 133_L (e.g., the symbol "1" may represent an integer within the interval [1, L]), the controller IC such as the host controller IC 105 (e.g., a logic circuit in the queue notification circuit 130) may set the one-bit IAG notification to be equal to the first predetermined logic value such as the logic value "1" (e.g., set the one-bit IAG notification as the logic value "1" and/or change the one-bit IAG notification from a previous or default logic value such as the logic value "0"). For example, there may be more than one interrupt from more than one IAG among the plurality of IAGs 133_1, 133_2, . . . and 133_L, and the program module 102P running on the processor 102 may need to perform checking operations for all IAGs among the plurality of IAGs 133_1, 133_2, . . . and 133_L one by one to determine which IAG(s) among these IAGs have sent the interrupt(s), no matter how many IAGs have sent the interrupt(s). According to some embodiments, the controller IC such as the host controller IC 105 can operate without disabling the queue auxiliary notification register 132, and more particularly, can collect the associated queue auxiliary notification information into the queue auxiliary notification register 132 to indicate which source(s) (e.g., which IAG(s)) have sent the interrupt(s), to make the program module 102P be capable of performing the subsequent operations as soon as possible, and thereby improve the overall performance.

Figure 6A:
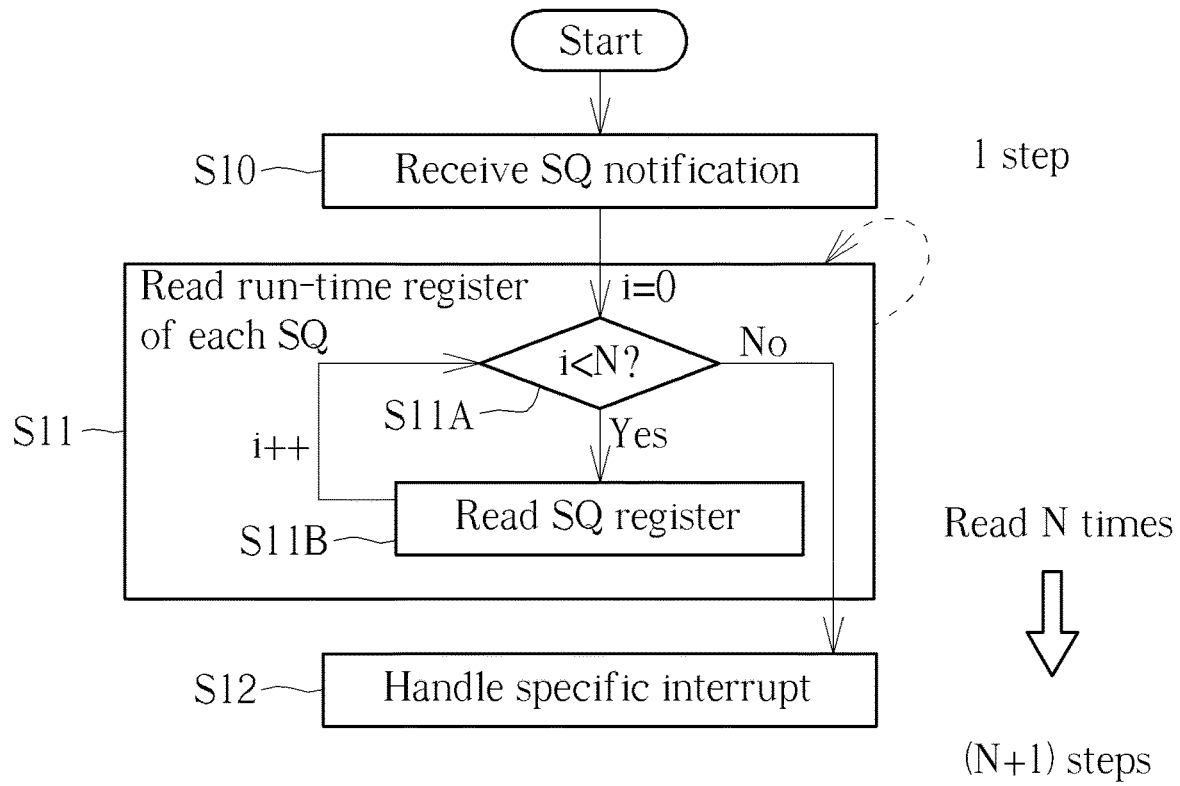
FIG. 6A is a working flow of the one-bit SQ notification control scheme shown in FIG. 3.

FIG. 6A is a working flow of the one-bit SQ notification control scheme shown in FIG. 3. For better comprehension, assume that the queue auxiliary notification register 112 shown in FIG. 1, as well as the function thereof, the associated operations, etc., can be temporarily disabled, but the present invention is not limited thereto.

In Step S10, the program module 102P running on the processor 102 may receive the first queue notification information such as the one-bit SQ notification (labeled "SQ notification" for brevity) from the queue notification register 111.

In Step S11, the program module 102P running on the processor 102 may read a run-time register of each SQ among the plurality of SQs 113_1, 113_2, . . . and 113_N, in order to determine which SQ(s) among these SQs have sent the interrupt(s), no matter how many SQs have sent the interrupt(s). For example, Step S11 may comprise multiple sub-steps such as Steps S11A and Step S11B, where a loop index i of a loop comprising Steps S11A and Step S11B may have an initial value such as zero (labeled "i=0" for brevity), and may be increased with an increment such as one (labeled "i++" for brevity), but the present invention is not limited thereto.

In Step S11A, the program module 102P running on the processor 102 may check whether the loop index i is less than the SQ count N. If Yes (e.g., i<N), Step S11B is entered; if No (e.g., i=N), Step S12 is entered.

In Step S11B, the program module 102P running on the processor 102 may read the run-time register of the SQ 113_(i+1) (labeled "Read SQ register" for brevity), to generate a reading result, for determining whether the SQ 113_(i+1) has sent an interrupt among the interrupt(s) mentioned above. For example, the SQ 113_(i+1) may represent the plurality of SQs 113_1, 113_2, . . . and 113_N for the cases of i=0, i=1, . . . and i=(N−1), respectively.

In Step S12, the program module 102P running on the processor 102 may handle specific interrupt(s) according to the N reading results of the respective run-time registers of the plurality of SQs 113_1, 113_2, . . . and 113_N.

Figure 6B:
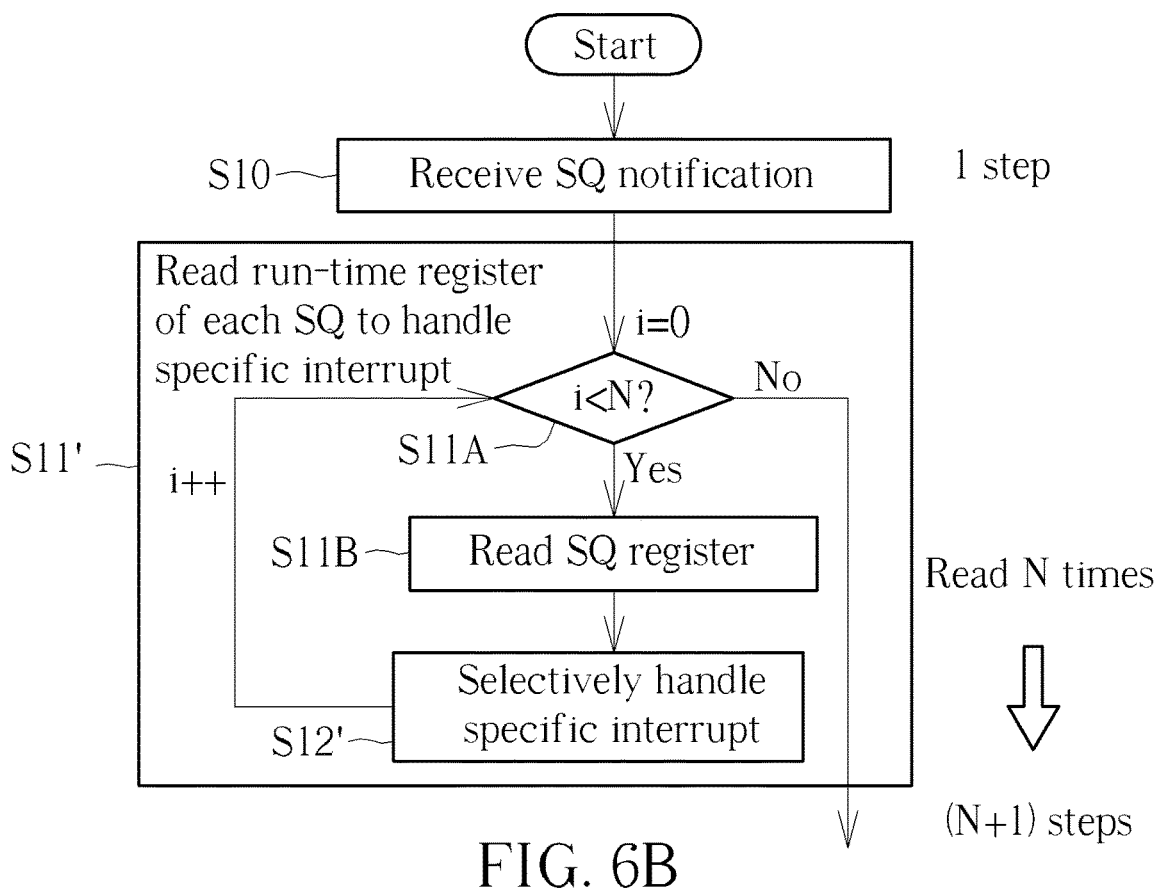
FIG. 6B is a working flow of the one-bit SQ notification control scheme shown in FIG. 3.

As shown in FIG. 6A, the operations of reading the run-time register of the SQ 113_(i+1) in Step S11B may be performed N times (labeled "Read N times" for brevity) after the operation of receiving the first queue notification information such as the one-bit SQ notification in Step S10 is performed (labeled "1 step" for brevity), so there may be at least N input/output (I/O) steps for reading the respective run-time registers of all SQs plus one more I/O step for obtaining the first queue notification information from the queue notification register 111 (labeled "(N+1) steps" for brevity) since the program module 102P running on the processor 102 started executing the working flow shown in FIG. 6A, but the present invention is not limited thereto. According to some embodiments, one or more steps may be added, deleted, or changed in the working flow shown in FIG. 6A. For example, Steps S11 and S12 in the working flow shown in FIG. 6A may be changed to become Steps S11' and S12' as shown in FIG. 6B, respectively. In the working flow shown in FIG. 6B, the aforementioned loop comprising Steps S11A and Step S11B may further comprise Step S12'. After the operation of Step S11B, in Step S12', the program module 102P running on the processor 102 may selectively handle a specific interrupt according to the reading result of the run-time register of the SQ 113_(i+1). For another example, during executing the aforementioned loop comprising Steps S11A and Step S11B, the program module 102P running on the processor 102 may handle the specific interrupt according to the reading result of the run-time register of the SQ 113_(i+1) at any time point when there is a need.

Please note that the operations of Step S11 in the one-bit SQ notification control scheme shown in FIG. 3 may be expressed with the following pseudo code:

```
for (i = 0; i < hba->max_q; i++)
{
    ufshcd_sq_handler(hba, i);
}
``` where the function ufshcd_sq_handler(hba, i) may represent the operation of Step S11B, the arrow operator "->" may be used with a pointer (e.g., the pointer named "hba" in the pseudo code shown above) to an object (e.g., a class, a structure, or a union), to reference an individual member among at least one member (e.g., one or more members) of this object, such as the member "max_q" of this object, and "hba->max_q" may represent the SQ count N, but the present invention is not limited thereto. For example, "hba->max_q" in the pseudo code shown above may represent any count among the SQ count N, the CQ count M and the IAG count L.

Based on the one-bit SQ notification control scheme shown in FIG. 3 (e.g., hba->max_q=N), in a situation where the queue auxiliary notification register 112 shown in FIG. 1 is temporarily disabled, the program module 102P running on the processor 102 may need to search for the source(s) of the interrupt(s) after receiving the one-bit notification such as the one-bit SQ notification, for example, by performing checking operations for all SQs among the plurality of SQs 113_1, 113_2, . . . and 113_N one by one, and more particularly, reading the respective run-time registers of all SQs among these SQs as illustrated with the working flow shown in FIG. 6A (or FIG. 6B), where there are N SQs that need to be checked since there may be more than one interrupt from more than one SQ among the plurality of SQs 113_1, 113_2, . . . and 113_N. In addition, based on the one-bit CQ notification control scheme shown in FIG. 4 (e.g., hba->max_q=M), in a situation where the queue auxiliary notification register 122 shown in FIG. 1 is temporarily disabled, the program module 102P running on the processor 102 may need to search for the source(s) of the interrupt(s) after receiving the one-bit notification such as the one-bit CQ notification, for example, by performing checking operations for all CQs among the plurality of CQs 123_1, 123_2, . . . and 123_M one by one, and more particularly, reading the respective run-time registers of all CQs among these CQs, where there are M CQs that need to be checked since there may be more than one interrupt from more than one CQ among the plurality of CQs 123_1, 123_2, . . . and 123_M. Additionally, based on the one-bit IAG notification control scheme shown in FIG. 5 (e.g., hba->max_q=L), in a situation where the queue auxiliary notification register 132 shown in FIG. 1 is temporarily disabled, the program module 102P running on the processor 102 may need to search for the source(s) of the interrupt(s) after receiving the one-bit notification such as the one-bit IAG notification, for example, by performing checking operations for all IAGs among the plurality of IAGs 133_1, 133_2, . . . and 133_L one by one, and more particularly, reading the respective run-time registers of all IAGs (e.g., the SQ(s) and/or the CQ(s) therein) among these IAGs, where there are L IAGs that need to be checked since there may be more than one interrupt from more than one IAG among the plurality of IAGs 133_1, 133_2, . . . and 133_L.

Figure 7:
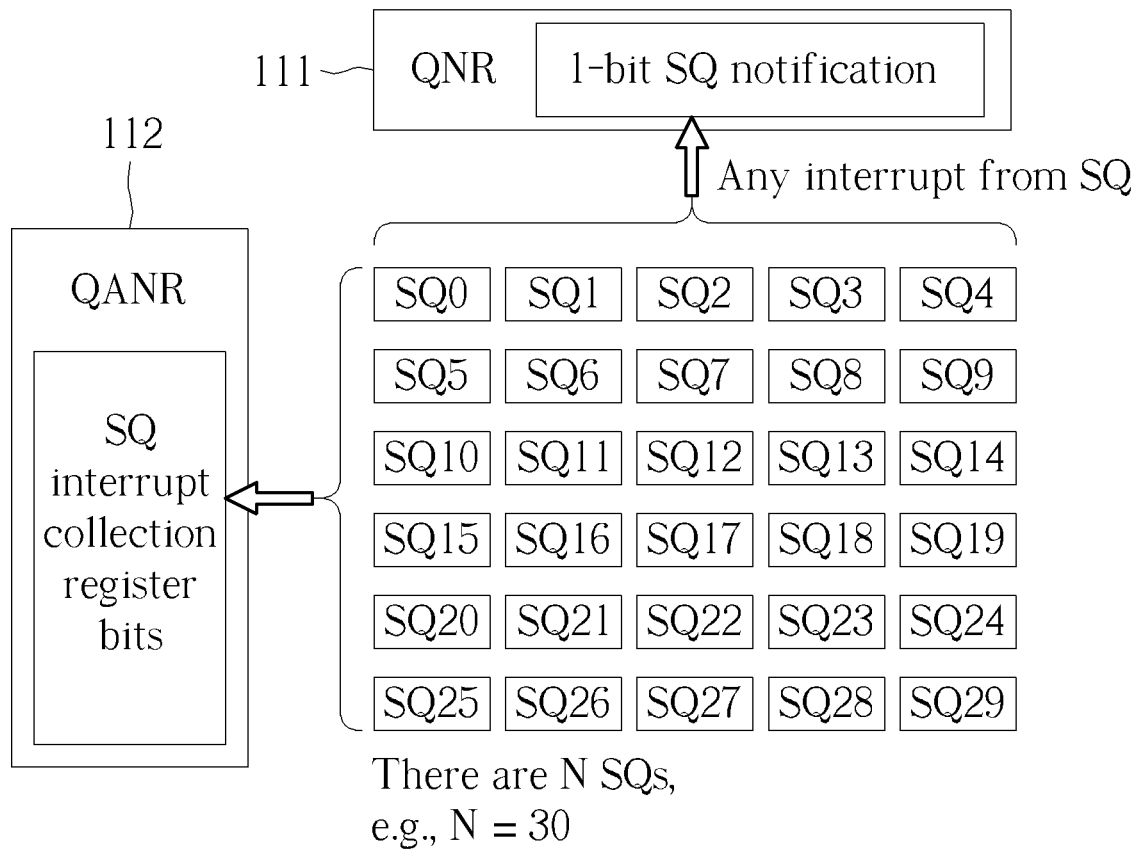
FIG. 7 is a diagram illustrating a one-bit SQ notification and interrupt collection control scheme of a method for controlling a storage device for a host device with aid of queue auxiliary notification information according to an embodiment of the present invention.

FIG. 7 is a diagram illustrating a one-bit SQ notification and interrupt collection control scheme of a method for controlling a storage device (e.g., the UFS mass storage device 150) for a host device (e.g., the host device 101) with aid of queue auxiliary notification information according to an embodiment of the present invention, where the method is applicable to the controller IC installed in the host device 101, such as the host controller IC 105. The controller IC such as the host controller IC 105 can operate according to the one-bit SQ notification and interrupt collection control scheme, and both of the queue notification register 111 and the queue auxiliary notification register 112 can operate without being temporarily disabled. The first queue notification register such as the queue notification register 111 can be implemented by way of a one-bit register, and therefore can be the one-bit queue notification register such as the one-bit SQ notification register, and the queue auxiliary notification register 112 can be implemented by way of a multi-bit register (e.g., N-bit register), and therefore can be a multi-bit queue auxiliary notification register such as a multi-bit SQ auxiliary notification register (e.g., N-bit SQ auxiliary notification register), where the first queue notification information in the queue notification register 111 can be regarded as one-bit notification such as one-bit SQ notification (labeled "1-bit SQ notification" for brevity), and the first queue auxiliary notification information in the queue auxiliary notification register 112 can be regarded as multi-bit notification such as SQ interrupt collection register bits (e.g., N-bits SQ interrupt collection register bits). In addition, there are N SQs such as the plurality of SQs 113_1, 113_2, . . . and 113_N in the SQ circuit 113, for example, the SQs SQ0-SQ29 in a situation where N=30 as shown in FIG. 7, but the present invention is not limited thereto. In some examples, the SQ count N may vary. Additionally, the first queue auxiliary notification information (e.g., the N-bits SQ interrupt collection register bits) in the queue auxiliary notification register 112 may be arranged to further indicate a set of first queues (e.g., a set of SQs) among the plurality of first queues (e.g., the plurality of SQs 113_1, 113_2, . . . and 113_N) that have sent a set of first interrupts, respectively, and more particularly, indicate whether there are interrupts from the plurality of SQs 113_1, 113_2, . . . and 113_N, respectively, where the first queue auxiliary notification information (e.g., the N-bits SQ interrupt collection register bits) may be implemented as N-bits bitmap having N bits respectively corresponding to the plurality of SQs 113_1, 113_2, . . . and 113_N, but the present invention is not limited thereto.

When there is any interrupt from any SQ 113_n among the plurality of SQs 113_1, 113_2, . . . and 113_N (e.g., the symbol "n" may represent an integer within the interval [1, N]), the controller IC such as the host controller IC 105 (e.g., the logic circuit in the queue notification circuit 110) may set the one-bit SQ notification to be equal to the first predetermined logic value such as the logic value "1" (e.g., set the one-bit SQ notification as the logic value "1" and/or change the one-bit SQ notification from a previous or default logic value such as the logic value "0"). For example, there may be more than one interrupt from more than one SQ among the plurality of SQs 113_1, 113_2, . . . and 113_N, and the program module 102P running on the processor 102 may refer to the first queue auxiliary notification information (e.g., the N-bits SQ interrupt collection register bits) to determine which SQ(s) among these SQs have sent the interrupt(s), having no need to perform checking operations for all SQs among the plurality of SQs 113_1, 113_2, . . . and 113_N one by one.

Figure 8:
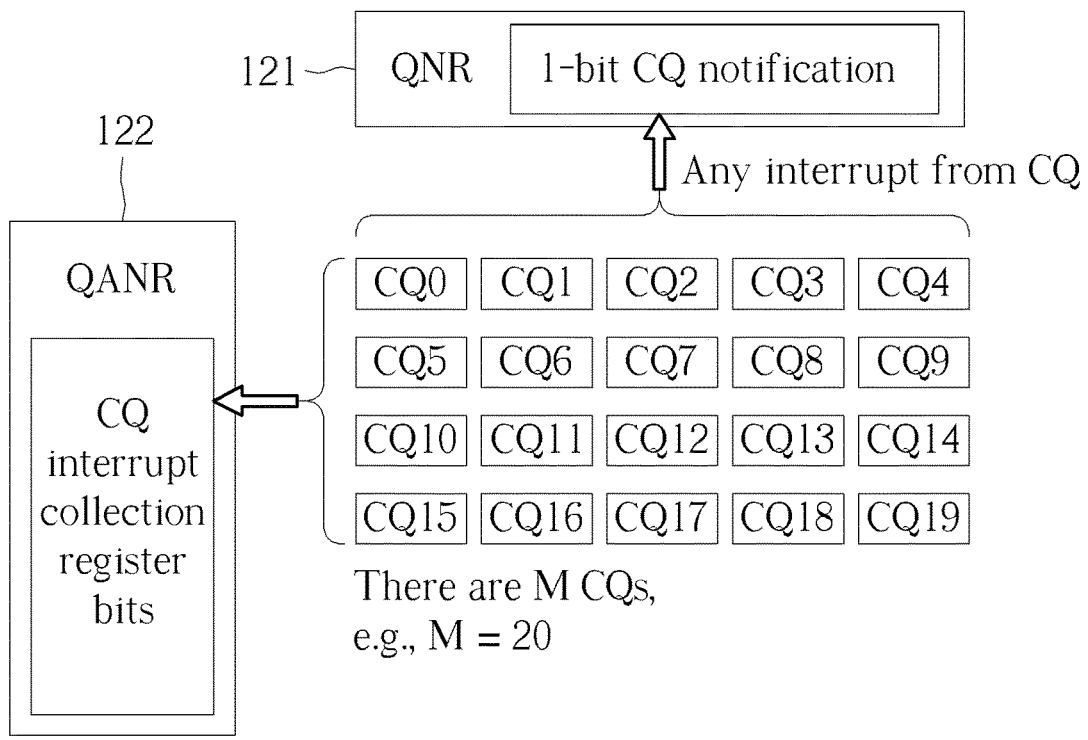
FIG. 8 is a diagram illustrating a one-bit CQ notification and interrupt collection control scheme of the method according to an embodiment of the present invention.

FIG. 8 is a diagram illustrating a one-bit CQ notification and interrupt collection control scheme of the method according to an embodiment of the present invention. The controller IC such as the host controller IC 105 can operate according to the one-bit CQ notification and interrupt collection control scheme, and both of the queue notification register 121 and the queue auxiliary notification register 122 can operate without being temporarily disabled. The second queue notification register such as the queue notification register 121 can be implemented by way of the one-bit register, and therefore can be the one-bit queue notification register such as the one-bit CQ notification register, and the queue auxiliary notification register 122 can be implemented by way of a multi-bit register (e.g., M-bit register), and therefore can be a multi-bit queue auxiliary notification register such as a multi-bit CQ auxiliary notification register (e.g., M-bit CQ auxiliary notification register), where the second queue notification information in the queue notification register 121 can be regarded as one-bit notification such as one-bit CQ notification (labeled "1-bit CQ notification" for brevity), and the second queue auxiliary notification information in the queue auxiliary notification register 122 can be regarded as multi-bit notification such as CQ interrupt collection register bits (e.g., M-bits CQ interrupt collection register bits). In addition, there are M CQs such as the plurality of CQs 123_1, 123_2, . . . and 123_M in the CQ circuit 123, for example, the CQs CQ0-CQ19 in a situation where M=20 as shown in FIG. 4, but the present invention is not limited thereto. In some examples, the CQ count M may vary. Additionally, the second queue auxiliary notification information (e.g., the M-bits CQ interrupt collection register bits) in the queue auxiliary notification register 122 may be arranged to further indicate a set of second queues (e.g., a set of CQs) among the plurality of second queues (e.g., the plurality of CQs 123_1, 123_2, . . . and 123_M) that have sent a set of second interrupts, respectively, and more particularly, indicate whether there are interrupts from the plurality of CQs 123_1, 123_2, . . . and 123_M, respectively, where the second queue auxiliary notification information (e.g., the M-bits CQ interrupt collection register bits) may be implemented as M-bits bitmap having M bits respectively corresponding to the plurality of CQs 123_1, 123_2, . . . and 123_M, but the present invention is not limited thereto.

When there is any interrupt from any CQ 123_m among the plurality of CQs 123_1, 123_2, . . . and 123_M (e.g., the symbol "m" may represent an integer within the interval [1, M]), the controller IC such as the host controller IC 105 (e.g., the logic circuit in the queue notification circuit 120) may set the one-bit CQ notification to be equal to the first predetermined logic value such as the logic value "1" (e.g., set the one-bit CQ notification as the logic value "1" and/or change the one-bit CQ notification from a previous or default logic value such as the logic value "0"). For example, there may be more than one interrupt from more than one CQ among the plurality of CQs 123_1, 123_2, . . . and 123_M, and the program module 102P running on the processor 102 may refer to the second queue auxiliary notification information (e.g., the M-bits CQ interrupt collection register bits) to determine which CQ(s) among these CQs have sent the interrupt(s), having no need to perform checking operations for all CQs among the plurality of CQs 123_1, 123_2, . . . and 123_M one by one.

Figure 9:
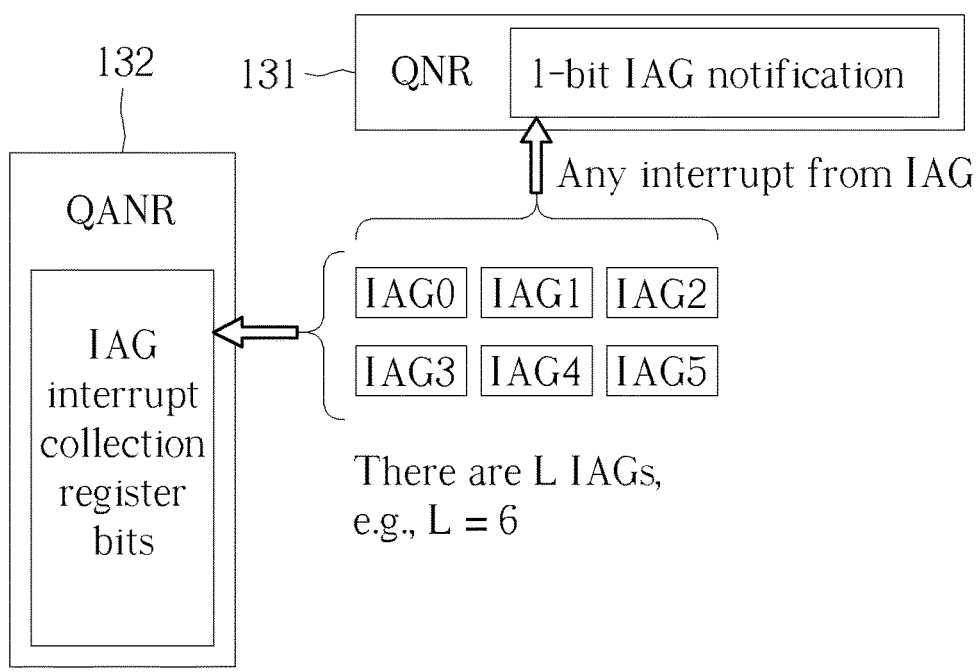
FIG. 9 is a diagram illustrating a one-bit IAG notification and interrupt collection control scheme of the method according to an embodiment of the present invention.

FIG. 9 is a diagram illustrating a one-bit IAG notification and interrupt collection control scheme of the method according to an embodiment of the present invention. The controller IC such as the host controller IC 105 can operate according to the one-bit IAG notification and interrupt collection control scheme, and both of the queue notification register 131 and the queue auxiliary notification register 132 can operate without being temporarily disabled. The queue group notification register such as the queue notification register 131 can be implemented by way of the one-bit register, and therefore can be the one-bit queue notification register such as the one-bit IAG notification register, and the queue auxiliary notification register 132 can be implemented by way of a multi-bit register (e.g., L-bit register), and therefore can be a multi-bit queue auxiliary notification register such as a multi-bit IAG auxiliary notification register (e.g., L-bit IAG auxiliary notification register), where the queue group notification information in the queue notification register 131 can be regarded as one-bit notification such as one-bit IAG notification (labeled "1-bit IAG notification" for brevity), and the queue group auxiliary notification information in the queue auxiliary notification register 132 can be regarded as multi-bit notification such as IAG interrupt collection register bits (e.g., L-bits IAG interrupt collection register bits). In addition, there are L IAGs such as the plurality of IAGs 133_1, 133_2, . . . and 133_L in the IAG circuit 133, for example, the IAGs IAG0-IAG5 in a situation where L=6 as shown in FIG. 5, but the present invention is not limited thereto. In some examples, the IAG count L may vary. Additionally, the queue group auxiliary notification information (e.g., the L-bits IAG interrupt collection register bits) in the queue auxiliary notification register 132 may be arranged to further indicate a set of queue groups (e.g., a set of IAGs) among the plurality of queue groups (e.g., the plurality of IAGs 133_1, 133_2, . . . and 133_L) that have sent a set of queue group interrupts, respectively, and more particularly, indicate whether there are interrupts from the plurality of IAGs 133_1, 133_2, . . . and 133_L, respectively, where the queue group auxiliary notification information (e.g., the L-bits IAG interrupt collection register bits) may be implemented as L-bits bitmap having L bits respectively corresponding to the plurality of IAGs 133_1, 133_2, . . . and 133_L, but the present invention is not limited thereto.

When there is any interrupt from any IAG 133_1 among the plurality of IAGs 133_1, 133_2, . . . and 133_L (e.g., the symbol "l" may represent an integer within the interval [1, L]), the controller IC such as the host controller IC 105 (e.g., the logic circuit in the queue notification circuit 130) may set the one-bit IAG notification to be equal to the first predetermined logic value such as the logic value "1" (e.g., set the one-bit IAG notification as the logic value "1" and/or change the one-bit IAG notification from a previous or default logic value such as the logic value "0"). For example, there may be more than one interrupt from more than one IAG among the plurality of IAGs 133_1, 133_2, . . . and 133_L, and the program module 102P running on the processor 102 may refer to the queue group auxiliary notification information (e.g., the L-bits IAG interrupt collection register bits) to determine which IAG(s) among these IAGs have sent the interrupt(s), having no need to perform checking operations for all IAGs among the plurality of IAGs 133_1, 133_2, . . . and 133_L one by one.

Figure 10A:
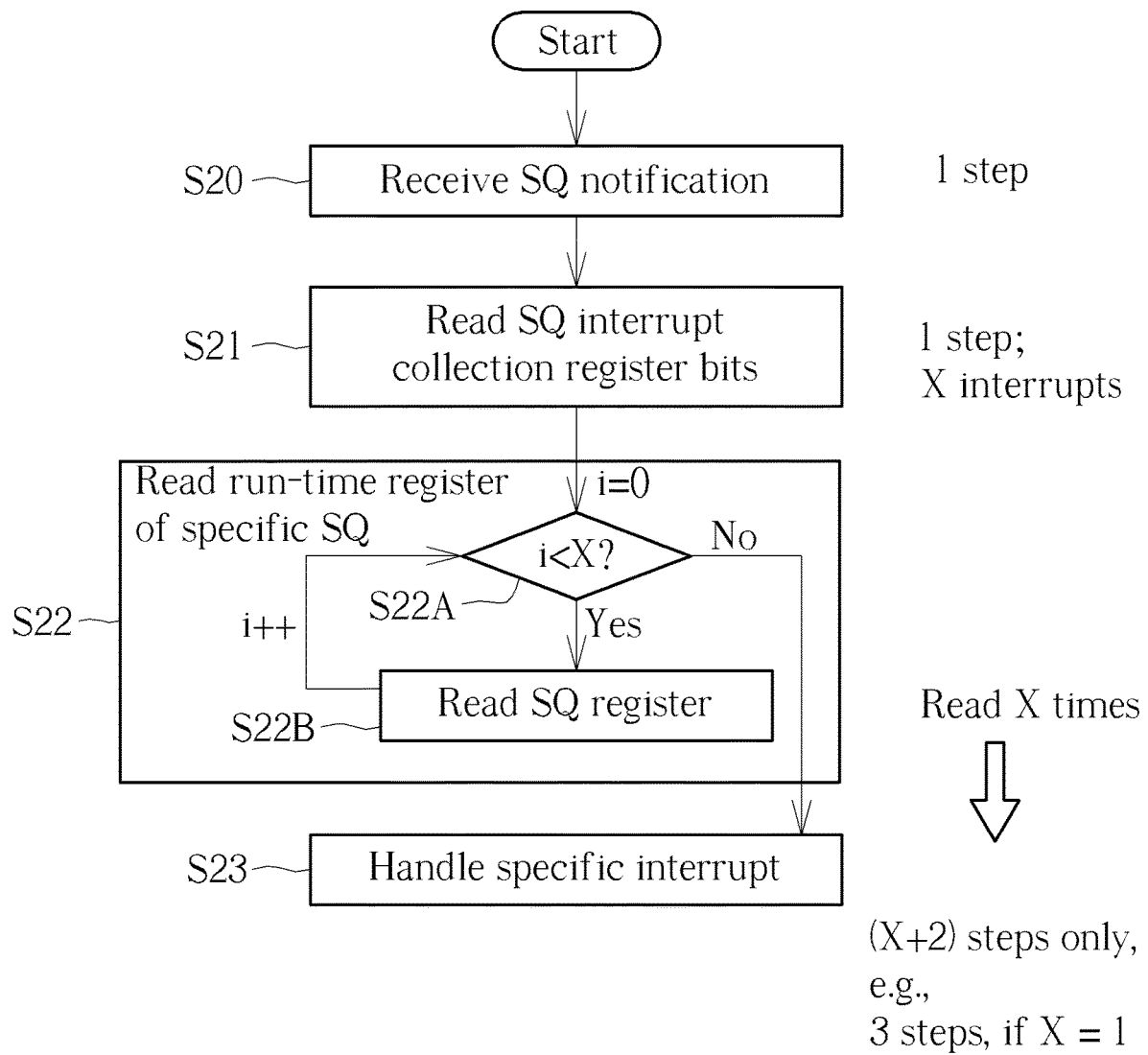
FIG. 10A is a working flow of the one-bit SQ notification and SQ interrupt collection control scheme shown in FIG. 7 according to an embodiment of the present invention.

FIG. 10A is a working flow of the one-bit SQ notification and SQ interrupt collection control scheme shown in FIG. 7 according to an embodiment of the present invention. The controller IC such as the host controller IC 105 can operate according to the one-bit SQ notification and interrupt collection control scheme, and both of the queue notification register 111 and the queue auxiliary notification register 112 can operate without being temporarily disabled.

In Step S20, the program module 102P running on the processor 102 may receive the first queue notification information such as the one-bit SQ notification (labeled "SQ notification" for brevity) from the queue notification register 111.

In Step S21, the program module 102P running on the processor 102 may read the first queue auxiliary notification information such as the N-bits SQ interrupt collection register bits (labeled "SQ interrupt collection register bits" for brevity) from the queue auxiliary notification register 112.

In Step S22, the program module 102P running on the processor 102 may read the run-time register of specific SQ(s) among the plurality of SQs 113_1, 113_2, . . . and 113_N according to the N-bits SQ interrupt collection register bits, where the N-bits SQ interrupt collection register bits may indicate which SQ(s) among these SQs have sent the interrupt(s), and the specific SQ(s) may represent the SQ(s) that have sent the interrupt(s). For example, Step S22 may comprise multiple sub-steps such as Steps S22A and Step S22B, where a loop index i of a loop comprising Steps S22A and Step S22B may have an initial value such as zero (labeled "i=0" for brevity), and may be increased with an increment such as one (labeled "i++" for brevity), but the present invention is not limited thereto. For better comprehension, assume that there are X interrupt(s) (e.g., the interrupt count X may be an integer within the interval [1, N]) from the specific SQ(s) among the plurality of SQs 113_1, 113_2, . . . and 113_N as indicated by the N-bits SQ interrupt collection register bits (labeled "X interrupts" for brevity).

In Step S22A, the program module 102P running on the processor 102 may check whether the loop index i is less than the interrupt count X. If Yes (e.g., i<X), Step S22B is entered; if No (e.g., i=X), Step S23 is entered.

In Step S22B, the program module 102P running on the processor 102 may read the run-time register of a specific SQ among the specific SQ(s) mentioned above (labeled "Read SQ register" for brevity), to generate a reading result, for further processing of the specific SQ that has sent an interrupt among the interrupt(s) mentioned above. For example, after Step S22B have been executed X times in the loop of Step S22, the program module 102P running on the processor 102 may have read the respective run-time registers of the specific SQ(s) mentioned above.

In Step S23, the program module 102P running on the processor 102 may handle specific interrupt(s) (e.g., the interrupt(s) from the specific SQ(s)) according to the X reading results of the respective run-time registers of the specific SQ(s) among the plurality of SQs 113_1, 113_2, . . . and 113_N.

As shown in FIG. 10A, the operations of reading the run-time register of the SQ 113_n (e.g., the aforementioned any SQ 113_n that has sent the aforementioned any interrupt in the one-bit SQ notification and SQ interrupt collection control scheme shown in FIG. 7) in Step S22B may be performed X times (labeled "Read X times" for brevity) after both of the operation of receiving the first queue notification information such as the one-bit SQ notification in Step S20 and the operation of reading the first queue auxiliary notification information such as the N-bits SQ interrupt collection register bits in Step S21 are performed (respectively labeled "1 step" for brevity), so there may be only X I/O steps for reading the respective run-time registers of the specific SQ(s) plus two more I/O steps for obtaining the first queue notification information from the queue notification register 111 and obtaining the first queue auxiliary notification information from the queue auxiliary notification register 112 (labeled "(X+2) steps only" for brevity) since the program module 102P running on the processor 102 started executing the working flow shown in FIG. 10A, for example, three I/O steps (labeled "3 steps" for brevity), if X=1.

Figure 10B:
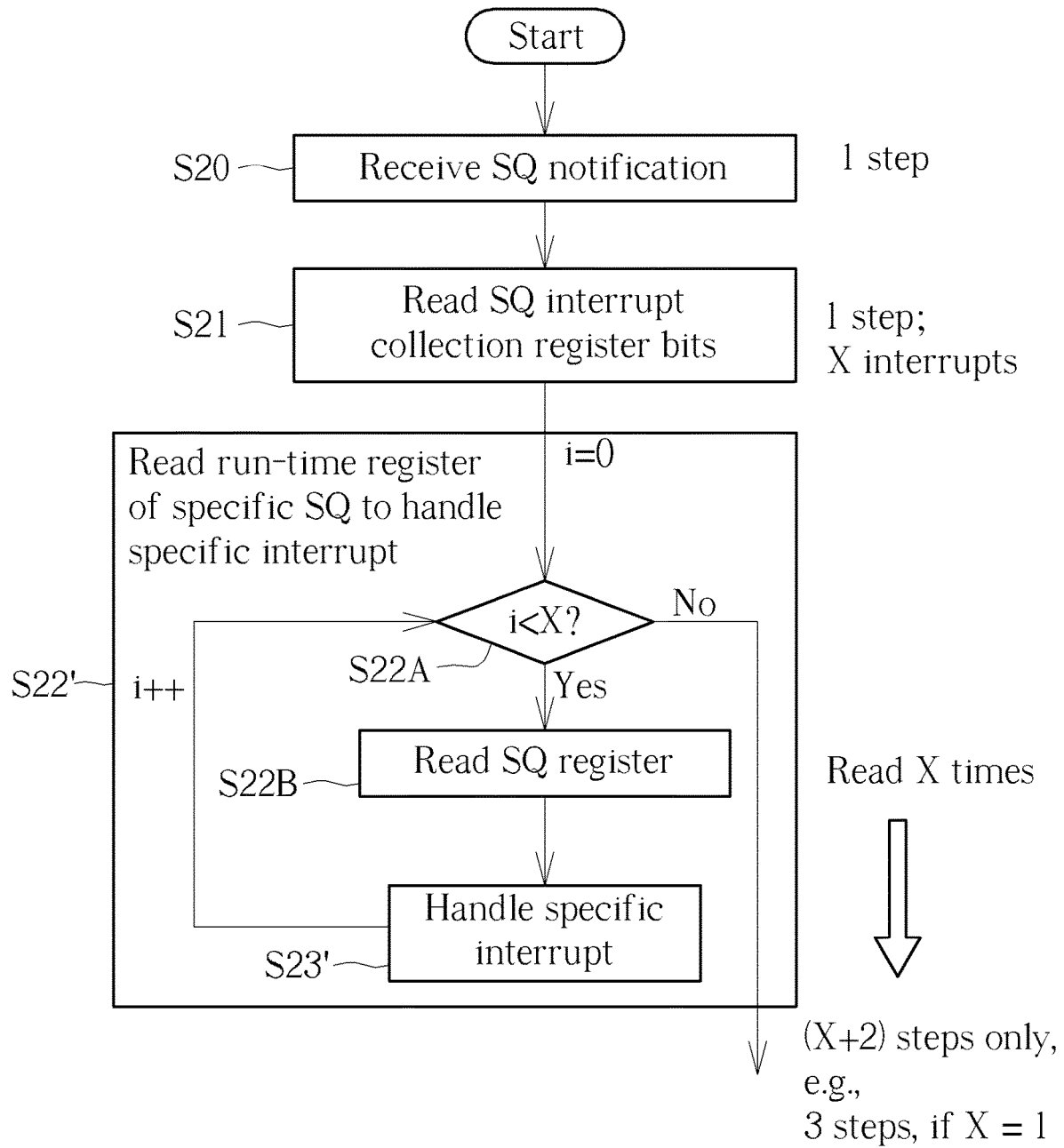
FIG. 10B is a working flow of the one-bit SQ notification and SQ interrupt collection control scheme shown in FIG. 7 according to another embodiment of the present invention.

For better comprehension, the method may be illustrated with the working flow shown in FIG. 10A, but the present invention is not limited thereto. According to some embodiments, one or more steps may be added, deleted, or changed in the working flow shown in FIG. 10A. For example, Steps S22 and S23 in the working flow shown in FIG. 10A may be changed to become Steps S22' and S23' as shown in FIG. 10B, respectively. In the working flow shown in FIG. 10B, the aforementioned loop comprising Steps S22A and Step S22B may further comprise Step S23'. After the operation of Step S22B, in Step S23', the program module 102P running on the processor 102 may handle a specific interrupt according to the reading result of the run-time register of the SQ 113_n (e.g., the aforementioned any SQ 113_n that has sent the aforementioned any interrupt in the one-bit SQ notification and SQ interrupt collection control scheme shown in FIG. 7). For another example, during executing the aforementioned loop comprising Steps S22A and Step S22B, the program module 102P running on the processor 102 may handle the specific interrupt according to the reading result of the run-time register of the SQ 113_n (e.g., the aforementioned any SQ 113_n that has sent the aforementioned any interrupt in the one-bit SQ notification and SQ interrupt collection control scheme shown in FIG. 7) at any time point when there is a need. For brevity, similar descriptions for these embodiments are not repeated in detail here.

According to some embodiments, the operations of Step S22 in the one-bit SQ notification and interrupt collection control scheme shown in FIG. 7 may be expressed with the following pseudo code:

```
for (i = 0; i < hba->max_q ; i++)
{
    if (test_bit(i, &sq_is))
        ufshcd_sq_handler(hba, i);
}
``` where the function ufshcd_sq_handler(hba, i) may represent the operation of Step S22B, the function test_bit(i, &sq_is) may represent the collected information, such as an interrupt collection register bit (e.g., the $i^{th}$ interrupt collection register bit) among the multi-bit notification (e.g., the N-bits SQ interrupt collection register bits), and "hba->max_q" may represent the SQ count N, but the present invention is not limited thereto. For example, the function test_bit(i, &sq_is) may represent the collected information, such as the interrupt collection register bit (e.g., the $i^{th}$ interrupt collection register bit) among the multi-bit notification (e.g., the N-bits SQ interrupt collection register bits, the M-bits CQ interrupt collection register bits, or the L-bits IAG interrupt collection register bits, and "hba->max_q" in the pseudo code shown above may represent the associated count among the SQ count N, the CQ count M and the IAG count L.

Based on the one-bit SQ notification and interrupt collection control scheme shown in FIG. 7 (e.g., hba->max_q=N), in a situation where the controller IC such as the host controller IC 105 can operate without disabling the queue auxiliary notification register 112, and more particularly, can collect the first queue auxiliary notification information such as the N-bits SQ interrupt collection register bits into the queue auxiliary notification register 112 to indicate which source(s) such as which SQ(s) among the plurality of SQs 113_1, 113_2, . . . and 113_N have sent the interrupt(s), the program module 102P running on the processor 102 can determine the specific SQ(s) that have sent the interrupt(s) according to the N-bits SQ interrupt collection register bits and handle the specific interrupt(s) (e.g., the interrupt(s) from the specific SQ(s)) as soon as possible, having no need to perform checking operations for all SQs among the plurality of SQs 113_1, 113_2, . . . and 113_N one by one, where the controller IC (e.g., the host controller IC 105) that has collected the first queue auxiliary notification information (e.g., the N-bits SQ interrupt collection register bits) into the queue auxiliary notification register 112 can reduce the iterations of searching specific source(s) among these SQs as illustrated with the working flow shown in FIG. 10A (or FIG. 10B), and thereby improve the overall performance, but the present invention is not limited thereto. According to some embodiments, based on the one-bit CQ notification and interrupt collection control scheme shown in FIG. 8 (e.g., hba->max_q=M), in a situation where the controller IC such as the host controller IC 105 can operate without disabling the queue auxiliary notification register 122, and more particularly, can collect the second queue auxiliary notification information such as the M-bits CQ interrupt collection register bits into the queue auxiliary notification register 122 to indicate which source(s) such as which CQ(s) among the plurality of CQs 123_1, 123_2, . . . and 123_M have sent the interrupt(s), the program module 102P running on the processor 102 can determine specific CQ(s) that have sent the interrupt(s) according to the M-bits CQ interrupt collection register bits and handle the specific interrupt(s) (e.g., the interrupt(s) from the specific CQ(s)) as soon as possible, having no need to perform checking operations for all CQs among the plurality of CQs 123_1, 123_2, . . . and 123_M one by one, where the controller IC (e.g., the host controller IC 105) that has collected the second queue auxiliary notification information (e.g., the M-bits CQ interrupt collection register bits) into the queue auxiliary notification register 122 can reduce the iterations of searching specific source(s) among these CQs, and thereby improve the overall performance. According to some embodiments, based on the one-bit IAG notification and interrupt collection control scheme shown in FIG. 9 (e.g., hba->max_q=L), in a situation where the controller IC such as the host controller IC 105 can operate without disabling the queue auxiliary notification register 132, and more particularly, can collect the queue group auxiliary notification information such as the L-bits IAG interrupt collection register bits into the queue auxiliary notification register 132 to indicate which source(s) such as which IAG(s) among the plurality of IAGs 133_1, 33_2, . . . and 133_L have sent the interrupt(s), the program module 102P running on the processor 102 can determine specific IAG(s) that have sent the interrupt(s) according to the L-bits IAG interrupt collection register bits and handle the specific interrupt(s) (e.g., the interrupt(s) from the specific IAG(s)) as soon as possible, having no need to perform checking operations for all IAGs among the plurality of IAGs 133_1, 133_2, . . . and 133_L one by one, where the controller IC (e.g., the host controller IC 105) that has collected the queue group auxiliary notification information (e.g., the L-bits IAG interrupt collection register bits) into the queue auxiliary notification register 132 can reduce the iterations of searching specific source(s) among these IAGs, and thereby improve the overall performance. For brevity, similar descriptions for these embodiments are not repeated in detail here.

Figure 11:
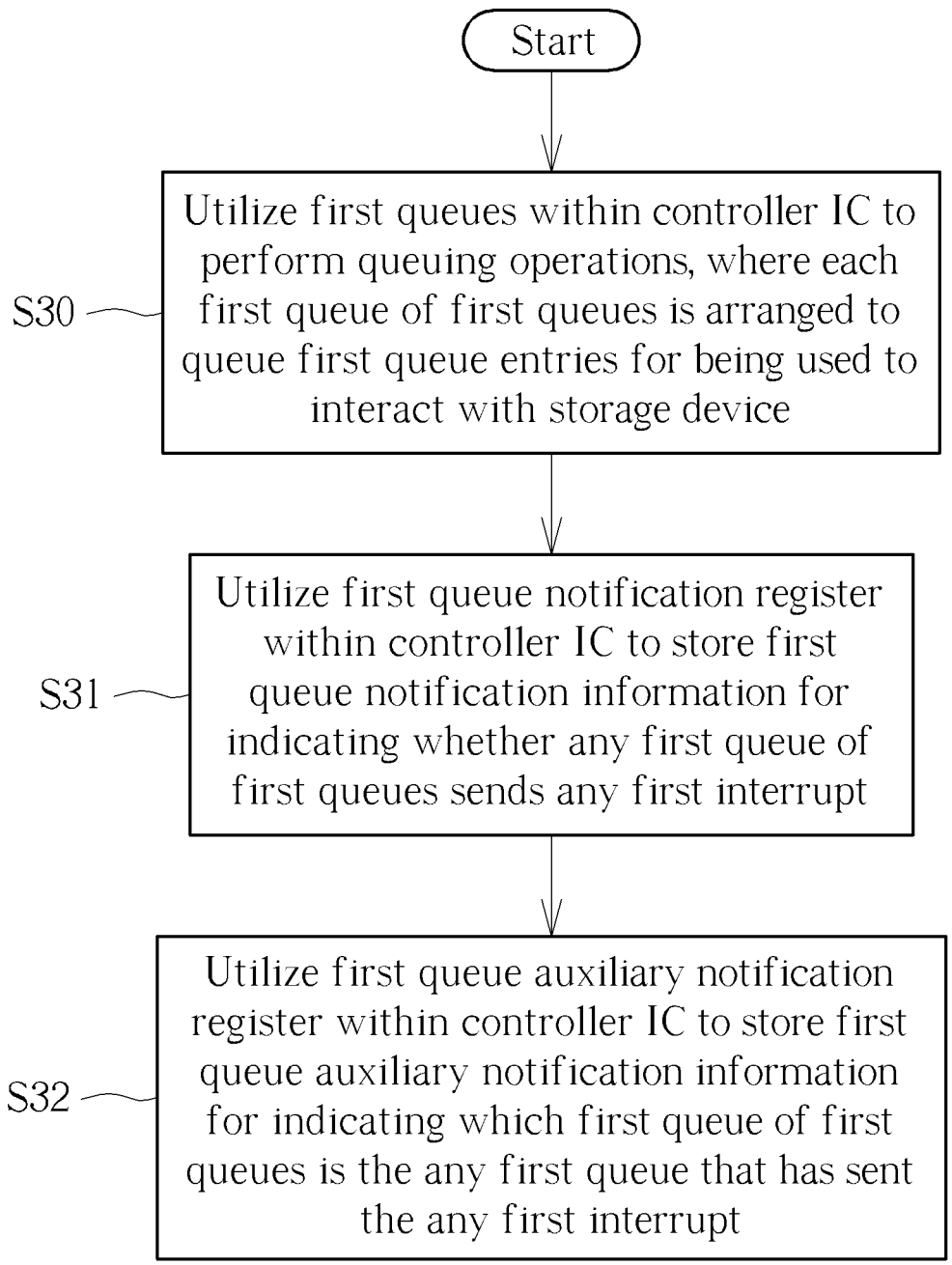
FIG. 11 is a working flow of the method according to an embodiment of the present invention.

FIG. 11 is a working flow of the method according to an embodiment of the present invention, where the method can be applied to the aforementioned controller IC (e.g., the host controller IC 105 shown in FIG. 1).

In Step S30, the controller IC (e.g., the host controller IC 105) may utilize the plurality of first queues (e.g., the plurality of SQs 113_1, 113_2, . . . and 113_N) within the controller IC (e.g., the host controller IC 105) to perform the first queuing operations, where each first queue of the plurality of first queues (e.g., each SQ of the plurality of SQs 113_1, 113_2, . . . and 113_N) is arranged to queue the first queue entries (e.g., the SQ entries) for being used to interact with the aforementioned storage device (e.g., the UFS mass storage device 150).

In Step S31, the controller IC (e.g., the host controller IC 105) may utilize the first queue notification register (e.g., the queue notification register 111) within the controller IC (e.g., the host controller IC 105) to store the first queue notification information (e.g., the one-bit SQ notification) for indicating whether any first queue of the plurality of first queues (e.g., any SQ of the plurality of SQs 113_1, 113_2, . . . and 113_N) sends any first interrupt.

In Step S32, the controller IC (e.g., the host controller IC 105) may utilize the first queue auxiliary notification register (e.g., the queue auxiliary notification register 112) within the controller IC (e.g., the host controller IC 105) to store the first queue auxiliary notification information (e.g., the N-bits SQ interrupt collection register bits) for indicating which first queue of the plurality of first queues (e.g., which SQ of the plurality of SQs 113_1, 113_2, . . . and 113_N) is the aforementioned any first queue of the plurality of first queues (e.g., the aforementioned any SQ of the plurality of SQs 113_1, 113_2, . . . and 113_N) that has sent the aforementioned any first interrupt.

The processing circuit of the host device 101, such as the processor 102, may be arranged to control the operations of the host device 101, and the processing circuit such as the processor 102 may control the storage device (e.g., the UFS mass storage device 150) through the controller IC (e.g., the host controller IC 105) according to both of the first queue notification information (e.g., the one-bit SQ notification) and the first queue auxiliary notification information (e.g., the N-bits SQ interrupt collection register bits). For example, the processing circuit such as the processor 102 may be arranged to receive the first queue notification information (e.g., the one-bit SQ notification) to detect the occurrence of the aforementioned any first interrupt, read the first queue auxiliary notification information (e.g., the N-bits SQ interrupt collection register bits) from the first queue auxiliary notification register (e.g., the queue auxiliary notification register 112) to determine which first queue of the plurality of first queues (e.g., which SQ of the plurality of SQs 113_1, 113_2, . . . and 113_N) is the aforementioned any first queue of the plurality of first queues (e.g., the aforementioned any SQ of the plurality of SQs 113_1, 113_2, . . . and 113_N) that has sent the aforementioned any first interrupt, and read the aforementioned any first queue of the plurality of first queues. According to the first queue auxiliary notification information (e.g., the N-bits SQ interrupt collection register bits), the processing circuit such as the processor 102 may be arranged to read a portion of first queues among the plurality of first queues (e.g., a portion of SQs among the plurality of SQs 113_1, 113_2, . . . and 113_N), rather than all first queues among the plurality of first queues (e.g., all SQs among the plurality of SQs 113_1, 113_2, . . . and 113_N), to enhance the overall performance of the host device 101.

The controller IC such as the host controller IC 105 may be arranged to perform communications with the storage device such as the UFS mass storage device 150 according to at least one predetermined specification (e.g., one or more predetermined specifications). For example, the aforementioned at least one predetermined specification may comprise Universal Flash Storage Host Controller Interface (UFSHCI) specification, and the controller IC such as the host controller IC 105 may represent a UFS host controller such as that defined in the UFS specification. In addition, the controller IC such as the host controller IC 105 may operate according to the method, and more particularly, utilize the first queue auxiliary notification register (e.g., the queue auxiliary notification register 112) to provide the first queue auxiliary notification information (e.g., the N-bits SQ interrupt collection register bits) to at least one other IC (e.g., one or more other IC) installed in the host device 101 to enhance overall performance of the host device 101, where the aforementioned at least one other IC may comprise a main IC (e.g., the processor 102 such as at least one application processor) of the host device 101, and the main IC (e.g., the processor 102 such as the application processor) may be arranged to control the operations of the host device 101, but the present invention is not limited thereto. For example, the aforementioned at least one other IC may comprise a System-on-Chip (SoC) IC, where the SoC IC may comprise the processor 102. For brevity, similar descriptions for this embodiment are not repeated in detail here.

For better comprehension, the method may be illustrated with the working flow shown in FIG. 11, but the present invention is not limited thereto. According to some embodiments, one or more steps may be added, deleted, or changed in the working flow shown in FIG. 11. For example, the controller IC (e.g., the host controller IC 105) may utilize the plurality of second queues (e.g., the plurality of CQs 123_1, 123_2, . . . and 123_M) within the controller IC (e.g., the host controller IC 105) to perform the second queuing operations, where each second queue of the plurality of second queues (e.g., each CQ of the plurality of CQs 123_1, 123_2, . . . and 123_M) is arranged to queue second queue entries (e.g., the CQ entries) for being used to interact with the storage device (e.g., the UFS mass storage device 150). In addition, the controller IC (e.g., the host controller IC 105) may utilize the second queue notification register (e.g., the queue notification register 121) to store the second queue notification information (e.g., the one-bit CQ notification) for indicating whether any second queue of the plurality of second queues (e.g., any CQ of the plurality of CQs 123_1, 123_2, . . . and 123_M) sends any second interrupt, and utilize the second queue auxiliary notification register (e.g., the queue auxiliary notification register 122) to store the second queue auxiliary notification information (e.g., the M-bits CQ interrupt collection register bits) for indicating which second queue of the plurality of second queues (e.g., which CQ of the plurality of CQs 123_1, 123_2, . . . and 123_M) is the any second queue of the plurality of second queues (e.g., the aforementioned any CQ of the plurality of CQs 123_1, 123_2, . . . and 123_M) that has sent the any second interrupt. For brevity, similar descriptions for these embodiments are not repeated in detail here.

According to some embodiments, the plurality of first queues may represent the plurality of SQs 113_1, 113_2, . . . and 113_N (e.g., the first queue entries may represent the SQ entries), the first queue notification register may represent the queue notification register 111 such as the one-bit SQ notification register (e.g., the first queue notification information may represent SQ notification information such as the one-bit SQ notification, and the any first queue may represent the any SQ of the plurality of SQs 113_1, 113_2, . . . and 113_N that has sent the any first interrupt), and the first queue auxiliary notification register may represent the queue auxiliary notification register 112 such as the N-bit SQ auxiliary notification register (e.g., the first queue auxiliary notification information may represent SQ auxiliary notification information for indicating which SQ of the plurality of SQs 113_1, 113_2, . . . and 113_N is the any SQ of the plurality of SQs 113_1, 113_2, . . . and 113_N that has sent the any first interrupt). In addition, the plurality of second queues may represent the plurality of CQs 123_1, 123_2, . . . and 123_M (e.g., the second queue entries may represent the CQ entries), the second queue notification register may represent the queue notification register 121 such as the one-bit CQ notification register (e.g., the second queue notification information may represent CQ notification information such as the one-bit CQ notification, and the any second queue may represent the any CQ of the plurality of CQs 123_1, 123_2, . . . and 123_M that has sent the any second interrupt), and the second queue auxiliary notification register may represent the queue auxiliary notification register 122 such as the M-bit CQ auxiliary notification register (e.g., the second queue auxiliary notification information may represent CQ auxiliary notification information for indicating which CQ of the plurality of CQs 123_1, 123_2, . . . and 123_M is the any CQ of the plurality of CQs 123_1, 123_2, . . . and 123_M that has sent the any second interrupt). This is for illustrative purposes only, and is not meant to be a limitation of the present invention. According to some embodiments, the plurality of first queues such as the plurality of SQs 113_1, 113_2, . . . and 113_N and the plurality of second queues such as the plurality of CQs 123_1, 123_2, . . . and 123_M, as well as the associated operations thereof, may be exchanged, where the queue notification circuit 110 (e.g., the queue notification register 111 and the queue auxiliary notification register 112) and the queue notification circuit 120 (e.g., the queue notification register 121 and the queue auxiliary notification register 122), as well as the associated operations thereof, may be exchanged correspondingly. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller integrated circuit (IC), for being installed in a host device to control a storage device positioned outside the host device, the controller IC comprising:
   a plurality of first queues, wherein each first queue of the plurality of first queues is arranged to queue first queue entries for being used to interact with the storage device;
   a first queue notification register, arranged to store first queue notification information for indicating whether any first queue of the plurality of first queues sends any first interrupt; and
   a first queue auxiliary notification register, arranged to store first queue auxiliary notification information for indicating which first queue of the plurality of first queues is the any first queue of the plurality of first queues that has sent the any first interrupt.

2. The controller IC of claim 1, wherein the controller IC is arranged to utilize the plurality of first queues to interact with the storage device and utilize both of the first queue notification register and the first queue auxiliary notification register to interact with a processing circuit within the host device, to allow the processing circuit to control the storage device through the controller IC.

3. The controller IC of claim 1, wherein the first queue notification register is a one-bit queue notification register.

4. The controller IC of claim 3, wherein the first queue auxiliary notification register is a multi-bit queue auxiliary notification register.

5. The controller IC of claim 1, wherein the first queue auxiliary notification register is a multi-bit queue auxiliary notification register; and the first queue auxiliary notification information is arranged to further indicate a set of first queues among the plurality of first queues that have sent a set of first interrupts, respectively.

6. The controller IC of claim 1, wherein the controller IC is arranged to perform communications with the storage device according to at least one predetermined specification.

7. The controller IC of claim 6, wherein the at least one predetermined specification comprises Universal Flash Storage Host Controller Interface (UFSHCI) specification, and the controller IC represents a Universal Flash Storage (UFS) host controller.

8. The controller IC of claim 1, wherein the controller IC is implemented as a Universal Flash Storage (UFS) host controller.

9. The controller IC of claim 1, further comprising:
a plurality of second queues, wherein each second queue of the plurality of second queues is arranged to queue second queue entries for being used to interact with the storage device;
a second queue notification register, arranged to store second queue notification information for indicating whether any second queue of the plurality of second queues sends any second interrupt; and
a second queue auxiliary notification register, arranged to store second queue auxiliary notification information for indicating which second queue of the plurality of second queues is the any second queue of the plurality of second queues that has sent the any second interrupt.

10. The controller IC of claim 9, wherein:
the plurality of first queues represents a plurality of submission queues (SQs), wherein the first queue entries represent SQ entries;
the first queue notification register represents an SQ notification register, wherein the first queue notification information represents SQ notification information, and the any first queue represents any SQ of the plurality of SQs that has sent the any first interrupt;
the first queue auxiliary notification register represents an SQ auxiliary notification register, wherein the first queue auxiliary notification information represents SQ auxiliary notification information for indicating which SQ of the plurality of SQs is the any SQ of the plurality of SQs that has sent the any first interrupt;
the plurality of second queues represents a plurality of completion queues (CQs), wherein the second queue entries represent CQ entries;
the second queue notification register represents a CQ notification register, wherein the second queue notification information represents CQ notification information, and the any second queue represents any CQ of the plurality of CQs that has sent the any second interrupt; and
the second queue auxiliary notification register represents a CQ auxiliary notification register, wherein the second queue auxiliary notification information represents CQ auxiliary notification information for indicating which CQ of the plurality of CQs is the any CQ of the plurality of CQs that has sent the any second interrupt.

11. The controller IC of claim 1, wherein:
the plurality of first queues represents a plurality of submission queues (SQs), wherein the first queue entries represent SQ entries;
the first queue notification register represents an SQ notification register, wherein the first queue notification information represents SQ notification information, and the any first queue represents any SQ of the plurality of SQs that has sent the any first interrupt; and
the first queue auxiliary notification register represents an SQ auxiliary notification register, wherein the first queue auxiliary notification information represents SQ auxiliary notification information for indicating which SQ of the plurality of SQs is the any SQ of the plurality of SQs that has sent the any first interrupt.

12. The controller IC of claim 1, wherein:
the plurality of first queues represents a plurality of completion queues (CQs), wherein the first queue entries represent CQ entries;
the first queue notification register represents a CQ notification register, wherein the first queue notification information represents CQ notification information, and the any first queue represents any CQ of the plurality of CQs that has sent the any first interrupt; and
the first queue auxiliary notification register represents a CQ auxiliary notification register, wherein the first queue auxiliary notification information represents CQ auxiliary notification information for indicating which CQ of the plurality of CQs is the any CQ of the plurality of CQs that has sent the any first interrupt.

13. The controller IC of claim 1, wherein the plurality of first queues are circular queues, and the controller IC is arranged to operate in a multi-circular queue (MCQ) mode.

14. The controller IC of claim 1, wherein the first queue auxiliary notification register provides the first queue auxiliary notification information to at least one other IC installed in the host device to enhance overall performance of the host device.

15. The controller IC of claim 14, wherein the at least one other IC comprises a main IC of the host device, and the main IC is arranged to control operations of the host device.

16. The controller IC of claim 14, wherein the at least one other IC comprises a System-on-Chip (SoC) IC.

17. The controller IC of claim 1, wherein a plurality of queue groups comprises multiple subsets of the plurality of first queues, respectively; and the controller IC further comprises:
a queue group notification register, arranged to store queue group notification information for indicating whether any queue group of the plurality of queue groups sends any queue group interrupt; and
a queue group auxiliary notification register, arranged to store queue group auxiliary notification information for indicating which queue group of the plurality of queue groups is the any queue group of the plurality of queue groups that has sent the any queue group interrupt.

18. The host device comprising the controller IC of claim 1, wherein the host device further comprises:
a processing circuit, arranged to control operations of the host device, wherein the processing circuit controls the storage device through the controller IC according to both of the first queue notification information and the first queue auxiliary notification information.

19. The host device of claim 18, wherein the processing circuit is arranged to receive the first queue notification information to detect occurrence of the any first interrupt, read the first queue auxiliary notification information from the first queue auxiliary notification register to determine which first queue of the plurality of first queues is the any first queue of the plurality of first queues that has sent the any first interrupt, and read the any first queue of the plurality of first queues.

20. The host device of claim 18, wherein according to the first queue auxiliary notification information, the processing circuit is arranged to read a portion of first queues among the plurality of first queues, rather than all first queues among the plurality of first queues, to enhance overall performance of the host device.

21. A method for controlling a storage device for a host device with aid of queue auxiliary notification information, the method being applicable to a controller integrated circuit (IC) installed in the host device, the storage device being positioned outside the host device, the method comprising:

utilizing a plurality of first queues within the controller IC to perform first queuing operations, wherein each first queue of the plurality of first queues is arranged to queue first queue entries for being used to interact with the storage device;

utilizing a first queue notification register within the controller IC to store first queue notification information for indicating whether any first queue of the plurality of first queues sends any first interrupt; and utilizing a first queue auxiliary notification register within the controller IC to store first queue auxiliary notification information for indicating which first queue of the plurality of first queues is the any first queue of the plurality of first queues that has sent the any first interrupt.

22. The method of claim 21, further comprising:

utilizing a plurality of second queues within the controller IC to perform second queuing operations, wherein each second queue of the plurality of second queues is arranged to queue second queue entries for being used to interact with the storage device;

utilizing a second queue notification register to store second queue notification information for indicating whether any second queue of the plurality of second queues sends any second interrupt; and utilizing a second queue auxiliary notification register to store second queue auxiliary notification information for indicating which second queue of the plurality of second queues is the any second queue of the plurality of second queues that has sent the any second interrupt.

23. The method of claim 22, wherein:

the plurality of first queues represents a plurality of submission queues (SQs), wherein the first queue entries represent SQ entries;

the first queue notification register represents an SQ notification register, wherein the first queue notification information represents SQ notification information, and the any first queue represents any SQ of the plurality of SQs that has sent the any first interrupt;

the first queue auxiliary notification register represents an SQ auxiliary notification register, wherein the first queue auxiliary notification information represents SQ auxiliary notification information for indicating which SQ of the plurality of SQs is the any SQ of the plurality of SQs that has sent the any first interrupt;

the plurality of second queues represents a plurality of completion queues (CQs), wherein the second queue entries represent CQ entries;

the second queue notification register represents a CQ notification register, wherein the second queue notification information represents CQ notification information, and the any second queue represents any CQ of the plurality of CQs that has sent the any second interrupt; and the second queue auxiliary notification register represents a CQ auxiliary notification register, wherein the second queue auxiliary notification information represents CQ auxiliary notification information for indicating which CQ of the plurality of CQs is the any CQ of the plurality of CQs that has sent the any second interrupt.

24. The method of claim 21, wherein:

the plurality of first queues represents a plurality of submission queues (SQs), wherein the first queue entries represent SQ entries;

the first queue notification register represents an SQ notification register, wherein the first queue notification information represents SQ notification information, and the any first queue represents any SQ of the plurality of SQs that has sent the any first interrupt; and the first queue auxiliary notification register represents an SQ auxiliary notification register, wherein the first queue auxiliary notification information represents SQ auxiliary notification information for indicating which SQ of the plurality of SQs is the any SQ of the plurality of SQs that has sent the any first interrupt.

25. The method of claim 21, wherein:

the plurality of first queues represents a plurality of completion queues (CQs), wherein the first queue entries represent CQ entries;

the first queue notification register represents a CQ notification register, wherein the first queue notification information represents CQ notification information, and the any first queue represents any CQ of the plurality of CQs that has sent the any first interrupt; and the first queue auxiliary notification register represents a CQ auxiliary notification register, wherein the first queue auxiliary notification information represents CQ auxiliary notification information for indicating which CQ of the plurality of CQs is the any CQ of the plurality of CQs that has sent the any first interrupt.

26. The method of claim 21, wherein the plurality of first queues are circular queues, and the controller IC is arranged to operate in a multi-circular queue (MCQ) mode.

27. The method of claim 21, further comprising:

utilizing the first queue auxiliary notification register to provide the first queue auxiliary notification information to at least one other IC installed in the host device to enhance overall performance of the host device.

* * * * *